United States Patent
Titt

[15] 3,643,768
[45] Feb. 22, 1972

[54] ONE-WAY SPRAG CLUTCH

[72] Inventor: Georg Titt, Furstenfeldbruck-Buchenau, Germany

[73] Assignee: Georg Muller Kugellagerfabrik K.G., Aussere Bayreuther Str., Nuernberg, Germany

[22] Filed: Jan. 29, 1970

[21] Appl. No.: 6,725

[30] Foreign Application Priority Data

Jan. 31, 1969 Germany..................P 19 04 785.9

[52] U.S. Cl. .........................................192/41 A, 192/45.1
[51] Int. Cl. ........................................................F16d 41/07
[58] Field of Search ......................192/41 A, 45.1; 188/82.8

[56] References Cited

UNITED STATES PATENTS

| | | | |
|---|---|---|---|
| 2,930,461 | 3/1960 | Dodge | 192/45.1 |
| 2,750,019 | 6/1956 | Ferris | 192/45.1 |
| 3,311,204 | 3/1967 | Barnard | 192/41 A |
| 3,353,639 | 11/1967 | Andriussi | 192/41 A |

Primary Examiner—Allan D. Herrmann
Attorney—Steinberg & Blake

[57] ABSTRACT

Clutches of the type having spaced clutch surfaces between which sprags extend for engaging and disengaging clutch bodies which have said clutch surfaces. Each clutch sprag has a wall of uniform thickness and substantially rectangular cross section adapted to extend between the clutch surfaces of the clutch bodies with this wall terminating in a pair of opposed end surfaces adapted respectively to be directed toward the clutch surfaces. The sprag has a pair of opposed clutch-engaging portions extending laterally from opposed end regions of the sprag wall in opposite directions from and merging with the end surfaces thereof, with these clutch-engaging portions having outer convexly curved clutch-engaging surfaces of substantially equal magnitudes. The wall of the sprag is inclined with respect to a pair of parallel planes which are tangent to the opposed end surfaces of the wall. With this sprag having a substantially Z-shaped profile. The sprag is manufactured from an elongated bar of initially rectangular cross section by cold rolling the bar to provide the laterally projecting portions which extend from the opposed side surfaces of the bar which initially is of rectangular cross section and which is converted by the cold rolling into the profile of substantially Z-shape. After this cold rolling the sprag bodies are simply struck from the bar.

5 Claims, 9 Drawing Figures

ONE-WAY SPRAG CLUTCH

BACKGROUND OF THE INVENTION

The present invention relates to clutches.

In particular, the present invention relates to overrunning or one-way clutches where a pair of clutch bodies which are to be engaged with and disengaged from each other respectively have clutch surfaces spaced from and directed toward each other. Such clutches conventionally include sprags which extend between the clutch surfaces of the clutch bodies and which have a configuration providing for pressing of the sprags against the clutch surfaces to engage the clutch while also permitting free movement of at least one of the clutch bodies with respect to the other when the clutch is disengaged.

The present invention relates particularly to nonround sprags having a pair of opposed convexly curved clutch-engaging surfaces and also including in some cases laterally extending pins for the purpose of engaging with or disengaging from each other, by sprag friction, oppositely movable parallel or coaxial clutch surfaces of a pair of clutch bodies. The sprags of the present invention are particularly suitable for one-way or overrunning clutches composed of a pair of concentric cylindrical clutch races having the sprags of the invention tiltable therebetween and guided in some cases in one or two cages and in some cases urged in the engaging direction by spring force.

Clutches of the above general type are already known wherein one of the clutch bodies brings about engagement of the clutch when it tends to overtake and move faster than another clutch body or wherein the clutch limits the operation of a component to only one direction of movement and prevents a reverse direction of movement. Also such clutches can be used for controls in many different types of mechanisms. Experience has shown that the efficiency of the operation and the reliability of the operation of such clutches, particularly with respect to the achievement of a high frequency of clutch engagement and disengagement, a high degree of accuracy in the operation, and a long operating life, depends to a very great degree upon the configuration of the sprags of the clutch. For example, German Pat. No. 1,224,997 shows an overrunning clutch of this general type where the sprags, which have convexly curved side surfaces, are formed in such a way that the distance between the engaging point of the curved side surface of one sprag to the next sprag and the rolling point of the sprag at the race surface, against which the sprag is held by a spring, is smaller than the distance between the engagement point and sliding point of the sprag at the other of the race surfaces. The necessity of maintaining this type of geometrical relationship renders the manufacture of such sprags difficult and complicated, particularly when the sprags must have small dimensions.

Particularly great manufacturing difficulties and manufacturing costs are encountered with known sprags of the above general type especially in the case where the sprags are to include axially extending pins used, for example, to suspend the sprags in the openings of a cage or to provide an abutting surface for a prestressed spring which urges the sprag to its engaged position. In the case where the known sprags are to be provided with such pins, then already manufactured, existing sprags must subsequently be provided with such axially projecting pins or the sprags must be manufactured in such a way that the pins are integrally formed with the remainder of each sprag when the latter is initially manufactured. The first case where a pin is subsequently cast into a sprag to be integrally formed therewith or the second case where the pin is initially formed with the remainder of the sprag body both require considerable costs and in the case of sprags of small dimensions, such as those having a radial height of approximately 4 mm., simply cannot be realized in large numbers in a commercially practical manner.

SUMMARY OF THE INVENTION

It is accordingly a primary object of the present invention to provide a sprag which will enable sprags of the above general type to be manufactured at dimensions which are desired in practice, particularly exceedingly small dimensions, in an easy inexpensive manner with the sprags having, if desired, axially extending pins projecting from a side surface thereof.

Thus, for this latter case it is an object of the invention to provide a sprag which will enable such pins, rod portions or the like, to be formed as part of a sprag without encountering the difficulties which are unavoidable with the present state of the art.

It is also an object of the present invention to provide a sprag which will result in a structure which is of great practical utility, for example in overrunning clutches, assuring full reliability and great efficiency in the operation of the clutch.

According to the invention each sprag has a wall of uniform thickness and substantially rectangular cross section adapted to extend between the clutch surfaces of the clutch bodies which are to be engaged with and disengaged from each other, with this wall terminating in a pair of opposed end regions. The sprag of the invention has a pair of opposed clutch-engaging portions extending laterally from the opposed end regions of this wall and having outer convexly curved clutch-engaging surfaces which are adapted respectively to engage the clutch surfaces of the clutch bodies, these clutch-engaging surfaces of the laterally extending clutch-engaging portions, which project in opposite directions from the end regions of the wall, having their outer clutch-engaging surfaces merging smoothly into and forming extensions of opposed end surfaces of the sprag wall. This latter wall is inclined with respect to a pair of parallel planes which are tangent to the opposed end surfaces thereof and has front and rear surfaces respectively directed toward the laterally extending opposed clutch-engaging portions so that the sprag of the invention has a substantially Z-shaped or S-shaped profile. The outer clutch-engaging surfaces of the sprag are preferably of approximately the same magnitude.

According to a further feature of the invention, where an axially extending pin or rod portion is required for the sprag, one of the laterally extending clutch-engaging portions of the sprag is simply pressed inwardly around such a pin or rod portion to tightly grip the latter and thus fix it to the sprag to form a part thereof in this exceedingly simple and inexpensive manner. Such pins or rod portions may project from both of the opposed side surfaces so as to from either guide pins for the sprags or pins against which elements such as springs may abut. Thus, where pairs of such pins are desired respectively extending from both of the opposed side surfaces of the sprag, it is only necessary to provide at each side surface a pair of these pins fixed to the remainder of the sprag by inward pressing of the clutch-engaging portions around the pins, and thus it is possible to achieve a sprag with four pins two of which project beyond one side surface and two of which project beyond the other side surface of the sprag.

When dealing with relatively small sprags such pins or rod portions may simply take the form of a steel wire spring, and even when dealing with such small components it is a simple matter simply to curve a laterally extending clutch-engaging portion of the sprag inwardly around such a wire to tightly grip the latter and fix it to the sprag. The clutch-engaging portion of the sprag may extend part of the way or completely around such a pin or rod portion. In this way it becomes possible with the structure and method of the invention to provide sprags which initially have no axially extending pins or rod portions with one or more of these pins or rod portions at one or both sides, without encountering any particularly great difficulties as has been the case up to the present time in the manufacture of conventional sprags with projections extending therefrom. With respect to the extent to which a clutch-engaging portion of a sprag is pressed inwardly around a pin or rod portion, it is only necessary to provide for such a pin and rod portion a gripping force capable of reliably maintaining the pin or rod portion fixed to the remainder of the sprag body.

According to a further feature of the invention it is possible to provide a sprag which has a pair of elongated rod portions fixed to the sprag by the inward curving of the opposed clutch-engaging portions tightly around such a pair of rod portions with the rod which has these portions also having an intermediate portion extending between these fixing rod portions and forming with a side surface of the sprag a closed loop. An endless annular coil spring may extend through such a loop, and of course through loops of additional sprags of this construction so that in this way the structure of the invention is of particular advantage because it enables a plurality of these sprags of the invention to be formed into a unitary assembly with such a spring, and this complete assembly can then be introduced as a unit between the clutch surfaces of the pair of clutch bodies. Because of the elasticity of the spring which holds the sprags of such an assembly together, the unit can easily be adapted to different clutch diameters and in fact forms a sprag type of overrunning clutch having no clutch races. Thus, such a unit can be used in those cases where there are already present a pair of clutch bodies of an existing clutch which requires only the addition of the sprags in order to complete the clutch. Thus, such units formed by a plurality of sprags and an endless coil spring interconnecting the same, without the clutch races and without cages, are also part of the present invention.

Of course, the invention includes other uses for the sprags of the invention. Thus, it is to be emphasized that the sprags of the invention are not only of use in overrunning or one-way clutches of the above general type but also in any installations where sprags or other frictionally operating bodies are required to be gripped or wedged between a pair of oppositely moving parallel or coaxially curved surfaces in order to connect or disconnect such surfaces.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
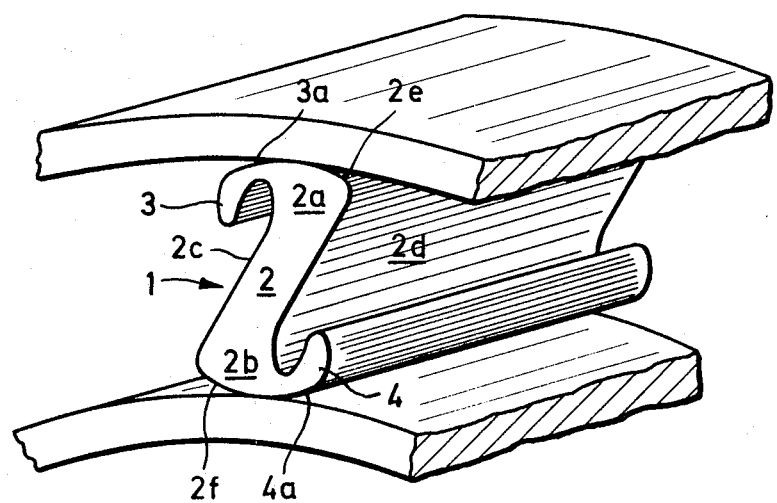
FIG. 1 is a fragmentary perspective illustration of a pair of clutch bodies showing therebetween a sprag of the invention.

Referring now to FIG. 1, there is illustrated therein a sprag 1 according to the invention. This sprag is shown in its position of use situated between the clutch surfaces of a pair of coaxial rotary clutch bodies in the form of clutch races one of which surrounds the other to define therewith the space in which the series of sprags of the clutch are to be located. The substantially Z-shaped or S-shaped profile of the sprag 1 of the invention is clearly apparent from FIG. 1. This sprag 1 of the invention includes a wall 2 of uniform thickness and substantially rectangular cross section extending between the clutch surfaces of the pair of coaxial clutch bodies. This wall 2 has an outer end region 2a and an inner end region 2b, and extending parallel to the axis of the clutch the wall 2 has a front surface 2c, only one edge of which is visible in FIG. 1, as well as a rear surface 2d which is clearly visible in FIG. 1. The pair of end regions 2a and 2b respectively terminate in opposed outer end surfaces 2e and 2f which extend parallel to the clutch axis.

This sprag 1 of the invention has a pair of opposed clutch-engaging portions 3 and 5 which respectively extend in opposite directions laterally from the opposed end regions 2a and 2b. These clutch-engaging portions 3 and 4 respectively have outer, convexly curved, clutch-engaging surfaces 3a and 4a, and these surfaces merge smoothly into the opposed end surfaces 2e and 2f of the wall 2, forming extensions of these opposed end surfaces.

FIG. 1 clearly illustrates the uniform wall thickness of the wall 2. This wall 2 is inclined with respect to a pair of parallel planes which are tangent to the opposed end surfaces 2e and 2f. This inclination of the wall 2 is such that its front surface 2c is directed toward the clutch-engaging portion 3 while its rear surface 2d is directed toward the clutch-engaging portion 4, so that in this way the sprag 1 is provided with the substantially Z-shaped or S-shaped profile referred to above.

Figure 2:
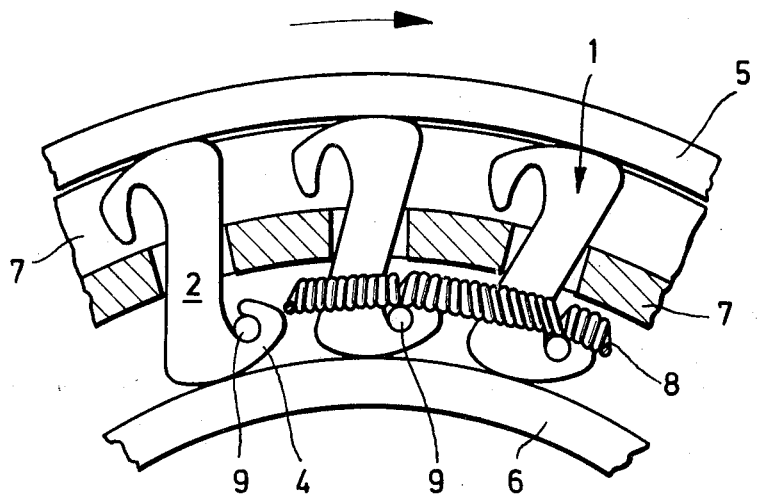
FIG. 2 is a partly sectional schematic side elevation of a clutch provided with the sprags of the invention.
Figure 3:
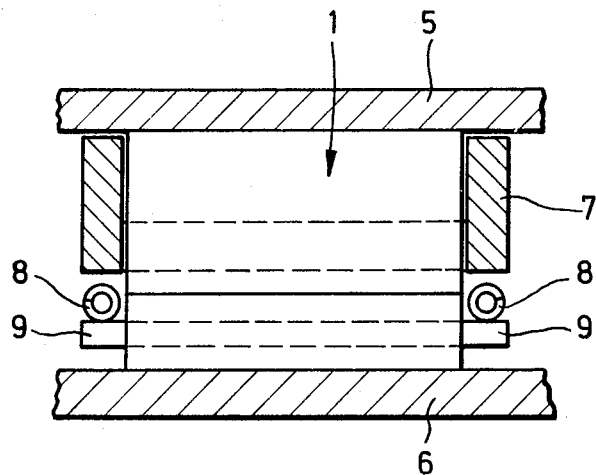
FIG. 3 is a fragmentary sectional elevation of the structure of FIG. 2 taken in a radial plane of the clutch.

In the overrunning clutch which is fragmentarily illustrated in FIGS. 2 and 3, each of the sprags 1 of the invention has an operative position extending between the clutch surfaces of the clutch races 5 and 6. In the illustrated example the several sprags are loosely guided in a cage 7. The clutch also includes an endless annular tensioned coil spring 8 at each side of the series of sprags of the clutch. These springs 8 respectively press inwardly against axially projecting pins 9 to hold the sprags of their inner positions and to urge them with a given prestress toward the engaging or clamping position. These pins 9 which axially project from the pair of opposed side surfaces of each sprag are formed by free end portions of a rod or wire fixed according to the invention, in the manner described above, to the remainder of the sprag, by inward curving of the clutch-engaging portion 4 so that it extends partly around and tightly grips the rod or wire for fixing the latter to the remainder of the sprag. Thus it is the inner surface of the clutch-engaging portion 4 which extends part of the way around and tightly grips the rod which has the projecting end portions 9.

Figure 4:
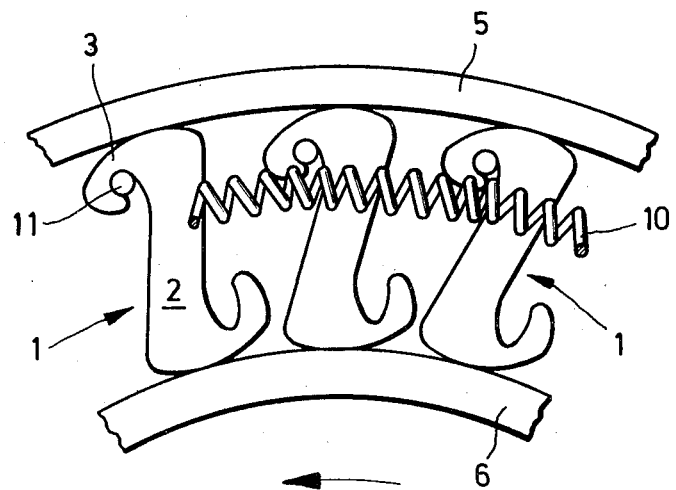
FIG. 4 is a fragmentary schematic side elevation of another embodiment of a clutch having the sprags of the invention.
Figure 5:
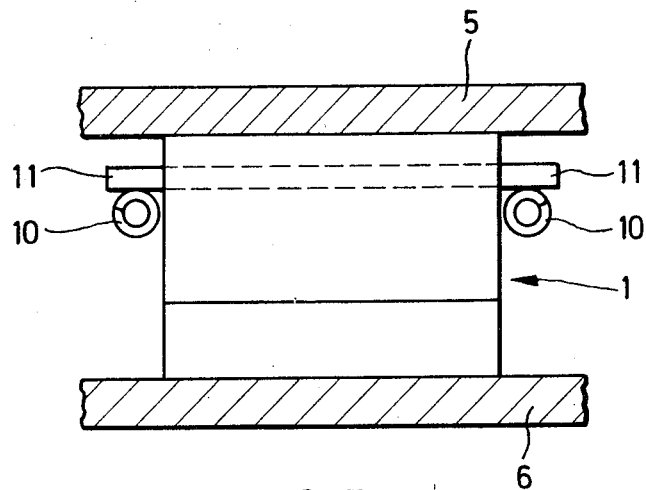
FIG. 5 is a fragmentary schematic sectional illustration of the structure of FIG. 4 taken in a radial plane of the clutch.

Referring to FIGS. 4 and 5, in the embodiment of the invention illustrated therein another type of overrunning clutch is provided having also the sprags 1 of the invention situated between the clutch surfaces of the coaxial rotary clutch bodies 5 and 6. With this embodiment there is an endless annular coil spring 10 which is however under compression so as to press outwardly against the pins 11 which project beyond the opposed side surfaces of each sprag in the manner shown most clearly in FIG. 5. Thus, the spring 10 serves to hold the sprag in their outer positions and to urge them in the clutch-engaging direction where they are clamped or gripped between the clutch races. In this case also it will be noted that the pair of axially extending pins 11 of each sprag are formed by the free end portions of a single rod or wire which in this case extends along and is gripped tightly by the inwardly curved outer clutch-engaging portion 3 of each sprag. It will be noted that with this embodiment there is no cage.

In the embodiment of the invention which is illustrated in FIG. 2 it is the outer clutch ring 5 which rotates with respect to and tends to overtake the inner ring 6 to bring about engagement of the clutch. However, in the case of FIG. 4, it is the inner clutch race 6 which when it overtakes and tends to rotate faster than the outer ring 5 brings about engagement of the clutch, so that both of the clutches have their operations indicated by the arrows shown in FIGS. 2 and 4, respectively. The operation and basic construction of overrunning clutches of this type are already known, so that further explanation is unnecessary. All types of overrunning clutches into which the sprags of the invention can be inserted are within the framework of the present invention.

Figure 6:
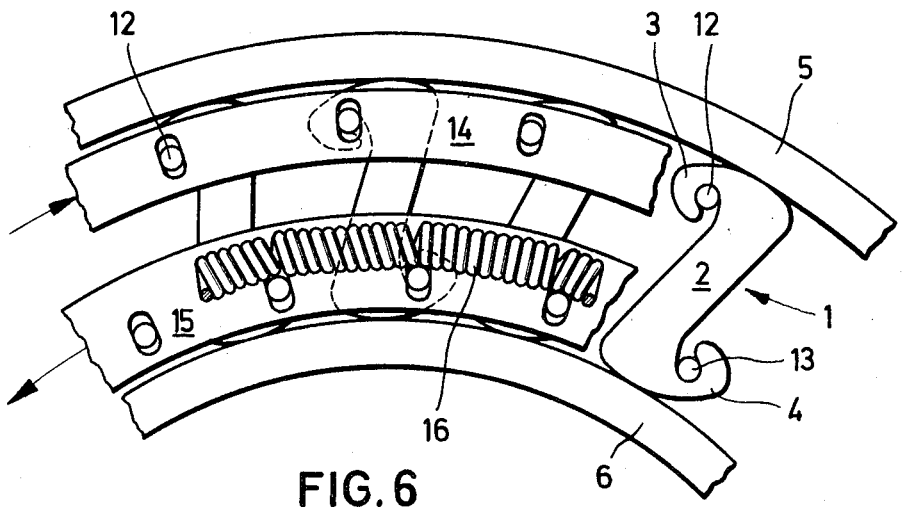
FIG. 6 is a schematic fragmentary side elevation of a third embodiment of a clutch provided with sprags of the invention.
Figure 7:
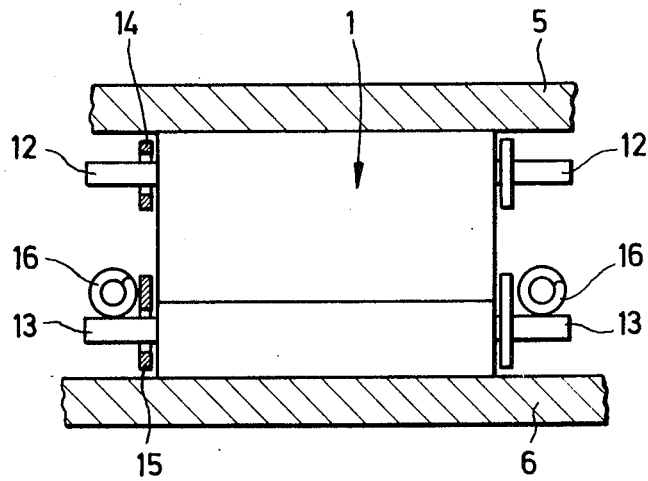
FIG. 7 is a fragmentary transverse section of the structure of FIG. 6 also taken in a radial plane.

Referring now to FIG. 6 and 7, there is illustrated a further embodiment of an overrunning clutch which also forms part of the present invention. With this embodiment there are the sprags 1 of the invention situated between the coaxial clutch rings 5 and 6 with ease having a pair of pins 12 and 13 projecting axially beyond each of its side surfaces. The outer pins 12 of each sprag form the opposed end portions of a single rod or wire fixed to each sprag in the manner described above in connection with the pins 11 of FIGS. 4 and 5. The pins 13 of each sprag form the opposed end portions of a single rod or wire fixed to the remainder of the sprag in the manner described above in connection with the pins 9 of the embodiment of FIGS. 2 and 3. The pins 12 and 13 are received in openings of a pair of coaxial ring cages 14 and 15 which are turnable in opposed directions and which are respectively situated in a manner illustrated in FIG. 6 coaxially between the clutch rings 5 and 6. These turnable ring cages 14 and 15 enable the clutch to be placed in an inoperative position since the turning of the ring cages in opposite direction, for example, by way of a lever connected to both of the ring cages, such a lever being easily manufactured without difficulty by a person skilled in the art, is capable of situating the sprags out of engagement not only with respect to the outer but also with respect to the inner clutch surfaces of the clutch races 5 and 6, so that no clutch operation can take place. Such ring cages 14 and 15 can be provided on both sides of the sprags or on only one side thereof, depending upon the particular practical requirements and dimensions of the clutch.

In the embodiment which is illustrated in FIGS. 6 and 7 there are a pair of endless annular coil springs 16 which are tensioned and which press inwardly against the inner pins 13, abutting against the latter and maintaining the sprags at their inner positions as long as the clutch is not rendered inoperative by the oppositely turnable ring cages 14 and 15. Instead of a ring spring which is under tension it is also possible with the invention to use in an embodiment of an overrunning clutch having a pair of oppositely turnable ring cages an endless spring which is under compression and which coacts at each side of the sprags with the pins 12 in the manner described above in connection with the spring 10 and pins 11 of FIG. 4. In this case also there is an assured capability or rendering the clutch inoperative by opposite turning of the ring cages 14 and 15.

Figure 8:
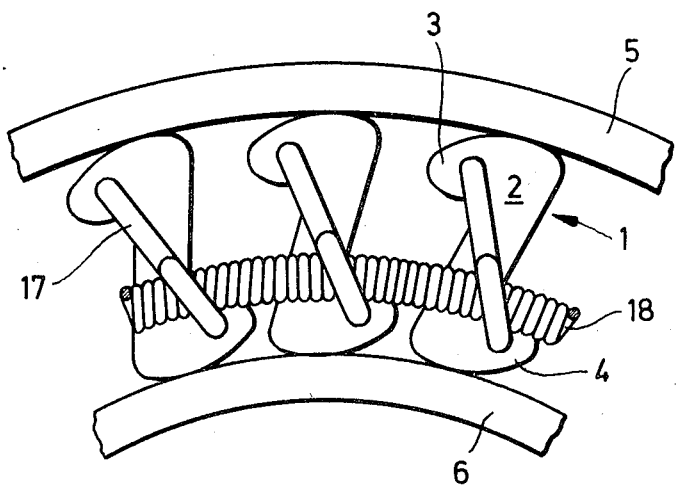
FIG. 8 is a fragmentary schematic side elevation of a further embodiment of a clutch of the invention.
Figure 9:
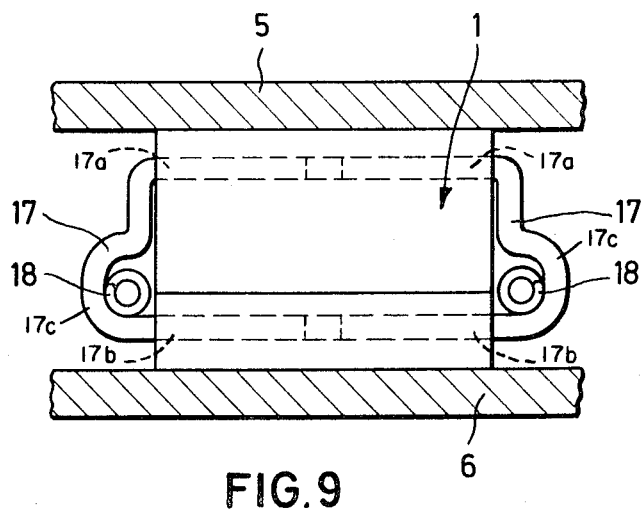
FIG. 9 is a fragmentary radial section of the structure of FIG. 8.

A further embodiment of a clutch of the invention is illustrated in FIGS. 8 and 9. With this embodiment the sprags 1 are arranged without any cages between the coaxial clutch races 5 and 6. Each sprag has a closed loop 17 at its opposed side surfaces, respectively. Each of the loops 17 is formed from a single rod or wire having elongated fixing portions 17a, 17b fixed with the sprag by the inward pressing of the clutch-engaging portions thereof around the elongated fixing portions of the rod in the manner described above in connection with the pins 9 and 11-13. Each of these rods or wires has between its elongated fixing portions which are tightly gripped by the clutch-engaging portions of each sprag an intermediate portion 17c which forms a closed loop with one of the side surfaces of each sprag, so that in this way a closed loop 17 is achieved. Thus, the clutch-engaging portion 4 is tightly pressed around one of the fixing portions of each rod or wire and the opposed clutch-engaging portion 3 is pressed tightly around the other of the fixing portions of the rod so that the intermediate portion of the latter will form the loop 17 in the manner shown in FIG. 9. In the particular example which is illustrated, each of the loops 17 has in the region of the inner clutch-engaging portion 4 a greater width making it possible for the endless coil springs 18 to pass through the loops of a series of sprags. The springs 18 are under tension and press against the inner parts of the loops to hold the sprags at their inner positions. In the event that sprags having loops of this type are to be used with endless coil springs which are under compression to press outwardly for holding the sprags outwardly against the outer race, then the rods will be formed so as to provide closed loops which are wider at their outer portions in order to be able to accommodate a pair of endless compressed coil springs which will extend in this case through the loops of the series of sprags. Thus, any person skilled in the art can convert the arrangement shown in FIG. 8 to this latter arrangement where a compression spring coacts with the loops to urge the sprags outwardly.

The particular embodiment of the invention which is shown in FIGS. 8 and 9 is of exceedingly great advantage since with the loops it is possible to form a complete circular series of sprags held together by the endless coil springs without requiring the use of any cage and without requiring any clutch races since the series of sprags interconnected by the endless springs which extend through the loops of the sprags forms in itself a single unitary subassembly. Such a unit can easily be adapted to the most widely different clutch diameters inasmuch as the number of sprags and the endless coil springs can be varied without requiring any different cages. Such rings of sprags held together by coil springs are also suitable for replacement purposes, for example, to be situated between races which are already present at a given machine and which have a size rendering a given assembly of sprags suitable for use therewith.

It is of course within the capability of any person skilled in the art to provide further variations in the various embodiments of the invention described above. For example, it is possible to use with each sprag only a single pin projecting axially from only one side thereof, and in such a case it is also possible to use with such a single pin on one side a pair of pins projecting from the other side of the sprag. Also it is possible to situate only one closed loop on one side of each sprag while on the other side there may be one or two axially extending pins. Such variations are within the framework of the invention and will be provided depending only upon the particular requirements which are encountered in practice. It is of course to be noted that in connection with the embodiment of FIGS. 8 and 9 it is by no means essential that the loops situated at both sides of each sprag as illustrated in FIG. 9 be made up of a pair of separate rods. Instead both of the loops can be formed from a single continuous rod or wire which is suitably bent to provide the illustrated loops. All of these changes and modifications can be made by a person of average mechanical skill without the exercise of invention and are of course within the framework of the present invention.

What is claimed is:

1. For use in a position extending between clutch surfaces of a pair of clutch bodies which are to be engaged with and disengaged from each other, a sprag comprising a wall of uniform thickness and of substantially rectangular cross section adapted to extend between said clutch surfaces and terminating in a pair of opposed end regions adapted respectively to be directed toward the clutch surfaces, and a pair of opposed clutch-engaging portions respectively extending laterally and in opposite directions from said opposed end regions of said wall and respectively terminating in outer, convexly curved clutch-engaging surfaces which merge smoothly into opposed end surfaces at said opposed end regions of said wall, said sprag having said wall thereof inclined with respect to a pair of parallel planes which are respectively tangent to said opposed end surfaces of said wall with said inclined wall having front and rear surfaces respectively directed toward said opposed laterally extending clutch-engaging portions, so that said sprag has a profile of substantially Z-shaped configuration, said sprag having a pair of opposed side surfaces each extending between said front and rear surfaces and between said opposed end surfaces of said wall, and at least one pin adapted to coact with another clutch component, said pin extending substantially parallel to said opposed end surfaces of said wall and projecting substantially perpendicularly beyond one of said side surfaces thereof, one of said clutch-engaging portions being curved inwardly at least part of the way around and tightly gripping said pin for fixing the latter to the remainder of said sprag.

2. The combination of claim 1 and wherein said pin is longer than said wall and extends beyond both of said side surfaces thereof.

3. The combination of claim 2 and wherein a pair of said pins are respectively fixed by inwardly curved parts of said clutch-engaging portions to said wall at the front and rear surfaces thereof next to said clutch-engaging portions to that at each side surface of the sprag there are a pair of pin portions projecting beyond said side surface of said wall.

4. For use in a position extending between clutch surfaces of a pair of clutch bodies which are to be engaged with and disengaged from each other, a sprag comprising a wall of uniform thickness and of substantially rectangular cross section adapted to extend between said clutch surfaces and terminating in a pair of opposed end regions adapted respectively to be directed toward the clutch surfaces, and a pair of opposed clutch-engaging portions respectively extending laterally and in opposite directions from said opposed end regions of said wall and respectively terminating in outer, convexly curved clutch-engaging surfaces which merge smoothly into opposed end surfaces at said opposed end regions of said wall, said sprag having said wall thereof inclined with respect to a pair of parallel planes which are respectively tangent to said opposed end surfaces of said wall with said inclined wall having front and rear portions respectively directed toward said opposed laterally extending clutch-engaging portions, so that said sprag has a profile of substantially Z-shaped configuration, said wall also terminating in a pair of opposed side surfaces each extending between said end surfaces and said front and rear surfaces thereof, and at least one rod having an intermediate portion defining a closed loop with one of said side surfaces, said rod having a pair of fixing portions extending from said intermediate portion thereof respectively at said front and rear surfaces of said wall next to said clutch-engaging portions, and the latter respectively being curved inwardly around and tightly gripping said fixing portions of said rod for fastening the latter to the remainder of said sprag.

5. The combination of claim 4 and wherein said rod has in the region of one of said clutch-engaging portions a configuration providing for the loop a magnitude sufficiently great to receive an annular coil spring which extends through the loop so that a plurality of the sprags may be connected together with an endless annular coil spring to form therewith a unit which may be inserted between the clutch surfaces of the clutch bodies.

* * * * *